US008397068B2

(12) United States Patent
Shur et al.

(10) Patent No.: US 8,397,068 B2
(45) Date of Patent: Mar. 12, 2013

(54) GENERIC FILE PROTECTION FORMAT

(75) Inventors: Andrey Shur, Redmond, WA (US);
Marcio Mello, Bellevue, WA (US);
Pankaj Kamat, Kirkland, WA (US);
Dan Knudson, Bellevue, WA (US);
Eugene Savchenko, Ontario (CA); Scott Cottrille, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 366 days.

(21) Appl. No.: 12/768,752

(22) Filed: Apr. 28, 2010

(65) Prior Publication Data
US 2011/0271103 A1 Nov. 3, 2011

(51) Int. Cl.
H04L 29/06 (2006.01)

(52) U.S. Cl. ........ 713/165; 713/158; 713/193; 713/183; 713/176; 726/27; 726/4; 711/162

(58) Field of Classification Search .................. 713/165, 713/193; 726/24–27
See application file for complete search history.

(56) References Cited

U.S. PATENT DOCUMENTS

| 6,618,735 | B1 | 9/2003 | Krishnaswami et al. | |
| 7,228,437 | B2 * | 6/2007 | Spagna et al. | 713/193 |
| 7,412,605 | B2 * | 8/2008 | Raley et al. | 713/189 |
| 7,679,666 | B2 * | 3/2010 | Hagihara et al. | 348/308 |
| 7,814,025 | B2 * | 10/2010 | Roever et al. | 705/65 |
| 7,886,159 | B2 * | 2/2011 | Nonaka et al. | 713/193 |
| 7,984,296 | B2 * | 7/2011 | Watanabe et al. | 713/168 |
| 8,117,464 | B1 * | 2/2012 | Kogelnik | 713/193 |
| 8,301,884 | B2 * | 10/2012 | Choi | 713/168 |
| 2006/0031222 | A1 | 2/2006 | Hannsmann | |
| 2007/0022306 | A1 * | 1/2007 | Lindsley | 713/193 |
| 2008/0072054 | A1 * | 3/2008 | Choi | 713/176 |
| 2008/0288788 | A1 * | 11/2008 | Krig | 713/193 |
| 2008/0300850 | A1 | 12/2008 | Chen et al. | |
| 2008/0320300 | A1 * | 12/2008 | Gkantsidis et al. | 713/158 |
| 2009/0106552 | A1 | 4/2009 | Mohamed | |
| 2009/0165080 | A1 | 6/2009 | Fahn et al. | |
| 2010/0037216 | A1 * | 2/2010 | Carcerano et al. | 717/173 |
| 2010/0185854 | A1 * | 7/2010 | Burns et al. | 713/165 |
| 2011/0055559 | A1 * | 3/2011 | Li et al. | 713/165 |

OTHER PUBLICATIONS

Miller E, Strong Security for distributed file systems, Apr. 2001, IEEE, vol. 18, pp. 35-38.*
Ball, Alex., "Briefing Paper: File Format and XML Schema Registries", Retrieved at << http://www.ukoln.ac.uk/projects/grand-challenge/papers/registryBriefing.pdf >>, 2006, pp. 13.

(Continued)

Primary Examiner — Nathan Flynn
Assistant Examiner — Viral Lakhia
(74) Attorney, Agent, or Firm — Zete Law, P.L.L.C.; MacLane C. Key

(57) ABSTRACT

A file may contain an unencrypted and an encrypted portion. The unencrypted portion may contain a layout section that may point to a published license, metadata, and a contents section, where the contents section is in the encrypted portion. The encrypted portion may contain the contents section which may act as a directory for one or more included files that may be compressed and stored in the encrypted portion. When the file is opened by a receiver, the receiver may read the published license and communicate with a security server to establish access rights and receive at least one key for decrypting at least a portion of the encrypted portion of the file. The receiver may then gain access to the included files.

20 Claims, 4 Drawing Sheets

OTHER PUBLICATIONS

Yu, et al., "Enterprise Digital Rights Management: Solutions against Information Theft by Insiders", Retrieved at << http://www.ecsl.cs.sunysb.edu/tr/rpe-drm-yy.pdf >>, RPE report, Sep. 2004, pp. 1-26.

Gilham, John., "Information Rights Management in Windows SharePoint Services 3.0", Retrieved at << http://blogs.msdn.com/andrew_may/attachment/1119375.ashx >>, Dec. 13, 2007, pp. 1.

Oiaga, Marius., "Protecting Sensitive Data with AD RMS", Retrieved at http://news.softpedia.com/newsPDF/Protecting-Sensitive-Data-with-AD-RMS-132954.pdf >>, Jan. 23, 2010, pp. 1-4.

"Custom IRM Protectors", Retrieved at << http://msdn.microsoft.com/en-us/library/ms439253.aspx >>, 2007, pp. 1.

* cited by examiner

GENERIC FILE PROTECTION FORMAT

BACKGROUND

Computer files can be difficult to transport and protect. When transporting a computer file, such as transmitting the file over the Internet, files can be protected by encrypting the file, but both the sender and receiver may both have the encryption keys. However, once the receiver of the file unencrypts the file, the file may be in the clear and transferred to users who may be unauthorized to access the file.

SUMMARY

A file may contain an unencrypted and an encrypted portion. The unencrypted portion may contain a layout section that may point to a published license, metadata, and a contents section, where the contents section is in the encrypted portion. The encrypted portion may contain the contents section which may act as a directory for one or more included files that may be compressed and stored in the encrypted portion. When the file is opened by a receiver, the receiver may read the published license and communicate with a security server to establish access rights and receive at least one key for decrypting at least a portion of the encrypted portion of the file. The receiver may then gain access to the included files.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
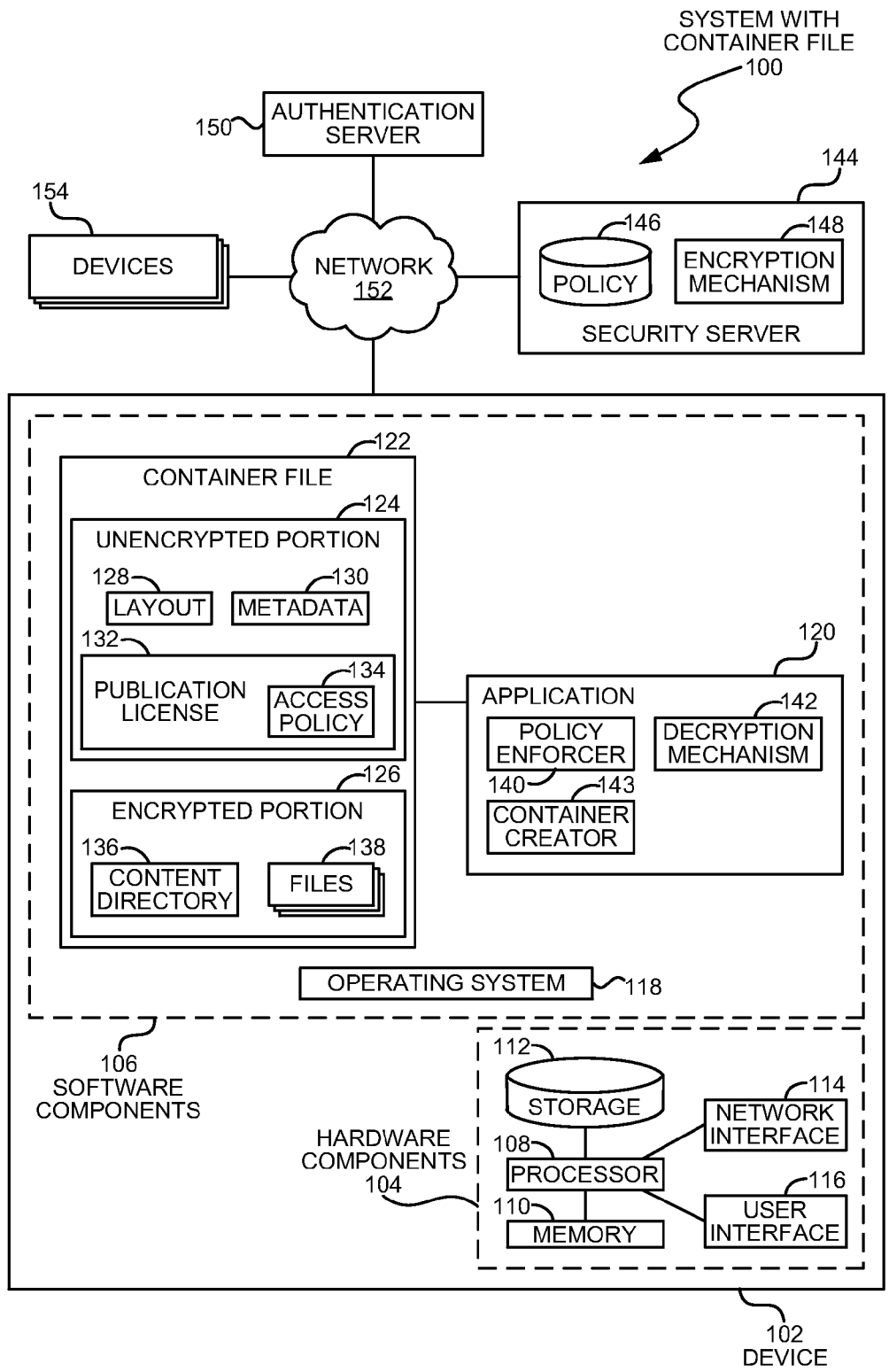
FIG. 1 is a diagram illustration of an embodiment showing an environment in which container file may be used.

A generic file protection format may define an unencrypted and an encrypted portion of a container file. The unencrypted portion may be used to gain access to the encrypted portion. In one embodiments, the unencrypted portion may contain information that can be used to communicate with a security server to gain access to the encrypted portion, which may contain one or more embedded files. The unencrypted portion may contain a publication license that may include a license identifier as well as information to communicate with a security server.

A receiver, which may be a user or computer, may use the publication license to communicate with a security server. The security server may determine whether or not the receiver may have access to the encrypted contents, and may return one or more keys to the receiver so that the receiver may unencrypt the encrypted portion and gain access to the file contents.

The encrypted portion may include a contents directory that may contain pointers to one or more embedded files within the container. In some cases, the contents may be arranged in a hierarchical fashion and may contain many individual files. In some embodiments, a separate encryption key may be used to encrypt/decrypt one or more of the embedded files.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a system that may use a container file. Embodiment 100 is a simplified example of a network environment in which a container file may be accessed by an application and the contents used by the application.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is an example use model for a container file. The container file may contain access policies that may define how the contents of the container file may be used. An application that may access the file may include a policy enforcement mechanism that may ensure that access occurs in accordance with the policy.

The container file may be a mechanism by which files may be packaged and transported across open communication mechanisms to other devices, while ensuring limited access to the files. The files in the container may be compressed and encrypted so that access cannot be gained if the container file were to fall into nefarious hands, or when access to certain documents may be controlled. Further, the access may be granted to the container file when proper credentials may be presented to a security server that may verify the credentials and respond with a key or other mechanism to decrypt the file.

The device 102 may represent a conventional computing device on which an application may execute. The device 102 may have hardware components 104 and software components 106 that may represent a conventional desktop or server computer. The device 102 may be any type of computing device, such as a desktop or server computer, game console, network appliance, or other similar device. In some embodiments, the device 102 may be a portable device, such as a laptop or netbook computer, personal digital assistant, mobile telephone, or other device. While not illustrated in embodiment 100, some embodiments may be deployed using cloud computing technologies that may or may not have a notion of a hardware platform on which an application may execute.

The hardware components 104 may include a processor 108, which may access random access memory 110 and non-volatile memory 112. The hardware components 106 may include a network interface 114 and a user interface 116.

The software components 106 may include an operating system 118 on which an application 120 may execute. The application 120 may be capable of accessing a container file 122 that may be used to transport and control access to files and other content.

The container file 122 may contain an unencrypted portion 124 and an encrypted portion 126. The unencrypted portion 124 may contain information that may be used by the application 120 to identify the container file 122, as well as gain access to the encrypted portion 126. The encrypted portion 126 may contain the payload of the container, which may be one or more files.

The unencrypted portion 124 may include a layout definition 128 that may include pointers to the metadata 130 and a publication license 132. The metadata 130 may include various metadata about the container file 122, such as the originator, date of creation, and other metadata.

The publication license 132 may include an access policy 134, which may define who may access the contents, what may be done with the contents, and any further restrictions on the contents. The publication license 132 may include a public encryption key or other identifier or credentials that may be presented to a security server prior to accessing the encrypted portion 126.

In some embodiments, multiple publication licenses may be used. For example, a first publication license may give read-only access to certain users while another publication license may give full access to other users.

The encrypted portion 126 may include a content directory 136 and one or more files or other containers for data. In some embodiments, the files may be arranged in a hierarchical structure, such as may be commonly used in a file directory system.

A detailed explanation of the container file may be found in the discussion of embodiment 200 presented later in this specification.

The application 120 may include a policy enforcer 140 that may ensure that any policy restrictions or limitations defined in the access policy 134 are enforced. The application 120 may present credentials to a security server 144 to receive decryption keys or other information that may be used by a decryption mechanism 142 to gain access to the encrypted portion 126 of the container file 122.

The application 120 may examine the publication license 132 to determine who may access the container file. When the access policy 134 defines specific users or groups of users that may access the container file, the application 120 may present user credentials to a security server 144. When the access policy 134 defines specific devices, groups of devices, or types of devices, the application 120 may present device credentials to a security server 144.

In many embodiments, the application 120 may present application credentials to the security server 144. The application credentials may identify the application 120 as being authentic as well as defining the types of access limitations that the application 120 may be capable of enforcing. The application credentials may be defined when an application may be created or installed, and may certify to the security server 144 that the application 120 may have the capabilities to enforce an access policy.

The device 102 may be connected to a network 152 through which a security server 144 may be accessed. The network 152 may be a local area network, a wide area network such as the Internet, or a combination of local area networks and wide area networks.

The security server 144 may receive a request to open the container file 122 from the application 120. The request may include a license identifier found in the publication license 132, as well as credentials for a user, device, application, or other credentials as defined in the publication license 132. The security server 144 may examine the request, compare the request against a local version of an access policy 146 defined for the container 122, and may verify the credentials against an authentication server 150. Based on the credentials and the other information in the request, the security server 144 may return a decryption key using an encryption mechanism 148 that may allow the application 120 to gain access to the encrypted portion 126 of the container file 122.

In many embodiments, the application 120 may be capable of creating a container file 122 that may be used by other devices 154. An example of a process for creating a container file may be found in embodiment 300.

Figure 2:
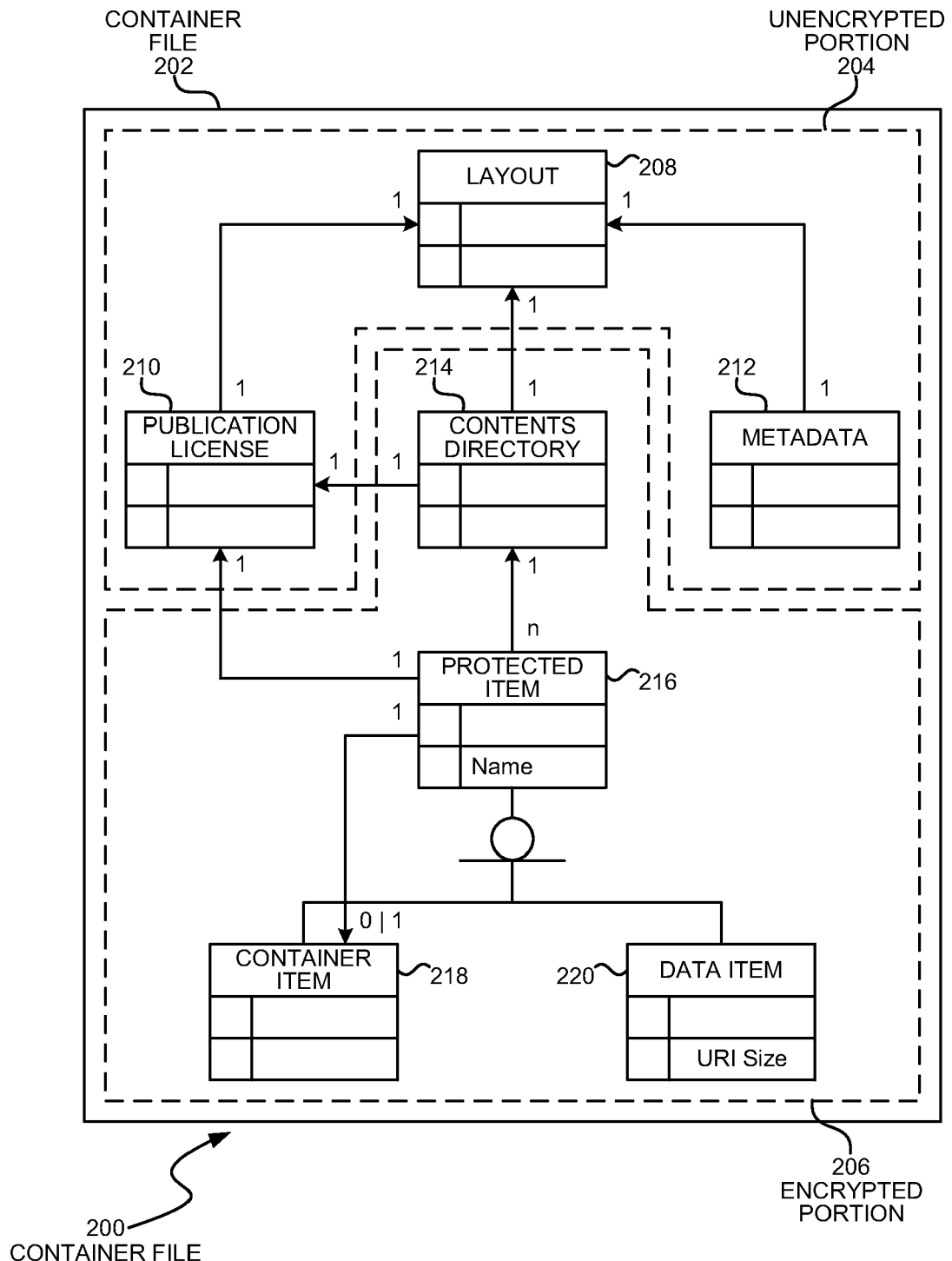
FIG. 2 is a diagram illustration of an embodiment showing an example container file.

FIG. 2 is a diagram of an embodiment 200, showing a diagram of a simplified example of a container file.

Embodiment 200 illustrates the components that make up one embodiment of a container file. Other embodiments may be configured differently and may have more or fewer components.

The container file 202 may contain an unencrypted portion 204 and an encrypted portion 206. The unencrypted portion 204 may contain a layout 208, a publication license 210, and metadata 212.

The layout 208 may contain the locations of the publication license 210, the contents directory 214, and metadata 212. In some embodiments, the layout 208 may be described using XML. An example layout section may include the following XML:

```
<Layout>
    <License Uri="/A001"/>
    <Metadata Uri="/A003"/>
    <Contents Uri="/A002"/>
</Layout>
```

The example layout may contain the publication license at a Uniform Resource Identifier (URI) of "A001", metadata at "A003", and contents at "A002". A schema for the layout may be defined using the following XML schema:

```
<?xml version="1.0" encoding="UTF-8"?>
<xsd:schema xmlns:xsd="http://www.w3.org/2001/XMLSchema">
    <xsd:element name="Layout">
        <xsd:complexType>
            <xsd:sequence>
                <xsd:element name="License" minOccurs="1"
                    maxOccurs="1">
                    <xsd:simpleType>
                        <xsd:extension base="xsd:string">
                            <xsd:attribute name="Uri" type="xsd:anyURI"
                                use="required"/>
                        </xsd:extension>
                    </xsd:simpleType>
                </xsd:element>
                <xsd:element name="Metadata" minOccurs="1"
                    maxOccurs="1">
                    <xsd:simpleType>
                        <xsd:extension base="xsd:string">
                            <xsd:attribute name="Uri" type="xsd:anyURI"
                                use="required"/>
                        </xsd:extension>
                    </xsd:simpleType>
                </xsd:element>
                <xsd:element name="Content" minOccurs="1"
                    maxOccurs="1">
                    <xsd:simpleType>
                        <xsd:extension base="xsd:string">
                            </xsd:attribute name="Uri" type="xsd:anyURI"
                                use="required"/>
                        </xsd:extension>
                    </xsd:simpleType>
                </xsd:element>
            </xsd:sequence>
        </xsd:complexType>
    </xsd:element>
</xsd:schema>
```

The publication license 210 may include an access policy that may define who may access the contents, what type of access may be permitted for the contents, and any restrictions.

The publication license 210 may include a license identifier that may be defined by a system that creates the container file 202 or by a security server. The license identifier may be a Globally Unique Identifier (GUID), public encryption key, or other identifier that may be used by a security server to positively identify the container file 202 when a request to access the container file is made.

In some embodiments, two or more containers having the same publication license may have the same license identifiers. In other embodiments, every container may have a different license identifier.

The metadata 212 may contain various properties describing the container file 202. Since the metadata 212 are unencrypted, applications may be able to access the metadata 212 without having the credentials to access the payload or protected items within the container file. Such metadata may be used by a file browser, for example, to identify and display various container files.

The contents directory 214 may include pointers to any of the protected items 216 within the container file. Once the contents 214 are decrypted, an application may use the contents directory 214 to navigate to a file or other data item 220 to inspect or retrieve the item. The data item may be any stream of data, including a file.

Within the contents directory 214 may be entries for the various protected items. A data item 220 may be arranged in a container 218 and defined as a protected item 216. The containers 218 may be nested containers that may represent a hierarchical or grouped set of containers, which may be named and defined in the contents directory 214.

The following is an example contents directory in XML:

```
<Contents>
    <Container Name="phoenix">
        <Data Name="foo.pdf" Size="709456"    Uri="/A001"/>
        <Container Name="resources">
            <Data Name="pic1.jpeg" Size="32460"    Uri="/A002"/>
            <Data Name="pic2.bmp" Size="16511"    Uri="/A003"/>
        </Container>
    </Container>
    <Data Name="readname.txt" Size="23086" Uri="/A004"/>
</Contents>
```

In the example, the contents directory may contain a container named "phoenix" in which a file "foo.pdf" is stored, along with a sub-container named "resources" in which files "pic1.jpeg" and "pic2.bmp" are stored. The file "readme.txt" may be placed at the highest level of the hierarchical organization and may not be a member of any container. Each of the files may have an associated URI which may refer to a location within the container file for that specific file.

A schema for the example contents directory may be:

```
<?xml version="1.0" encoding="UTF-8"?>
<xsd:schema xmlns:xsd="http://www.w3.org/2001/XMLSchema">
    <xsd:attribute name="Name" type="xsd:string"/>
    <xsd:attribute name="Size" type="xsd:integer"/>
    <xsd:attribute name="Uri" type="xsd:anyURI"/>
    <xsd:element name="Contents">
        <xsd:complex Type>
            <xsd:all>
                <xsd:element ref="Container" minOccurs="0"/>
                <xsd:element ref="Data" minOccurs="0"/>
```

-continued

```
      </xsd:all>
    </xsd:complexType>
  </xsd:element>
  <xsd:element name="Container">
    <xsd:complexType>
      <xsd:sequence>
        <xsd:element ref="Data" minOccurs="0"
          maxOccurs="unbounded"/>
        <xsd:element ref="Container" minOccurs="0"
          maxOccurs="unbounded"/>
      </xsd:sequence>
      <xsd:attribute ref="Name"/>
    </xsd:complexType>
  </xsd:element>
  <xsd:element name="Data">
    <xsd:complexType>
      <xsd:simpleContent>
        <xsd:extension base="xsd:string">
          <xsd:attribute ref="Name"/>
          <xsd:attribute ref="Size"/>
          <xsd:attribute ref="Uri"/>
        </xsd:extension>
      </xsd:simpleContent>
    </xsd:complexType="">
  </xsd:element>
</xsd:schema>
```

Figure 3:
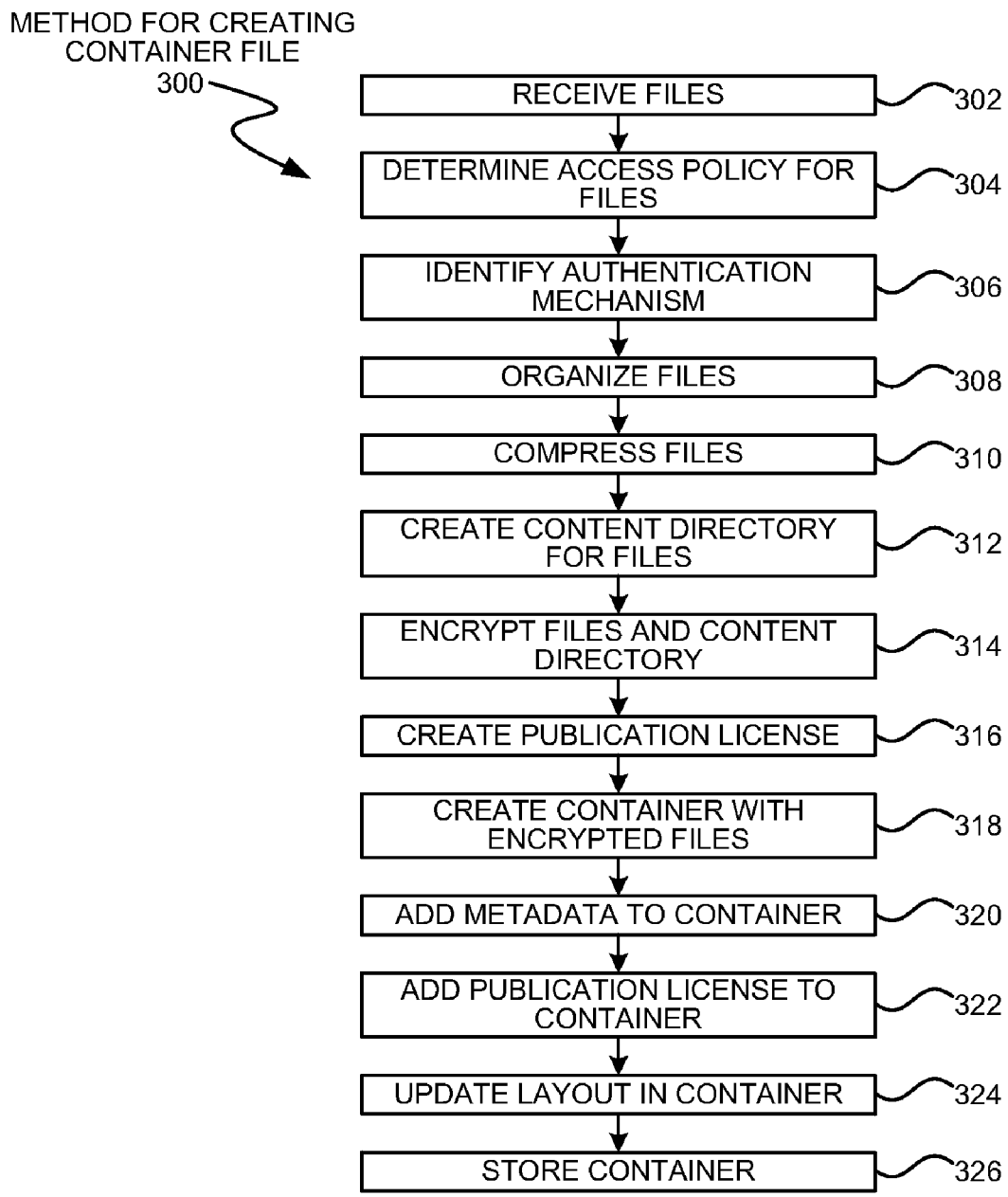
FIG. 3 is a flowchart illustration of an embodiment showing a method for creating a container file.

FIG. 3 is a flowchart illustration of an embodiment 300 showing a method for creating a container file. Embodiment 300 is an example embodiment that may be performed by an application that creates a container file. In some embodiments, a security server may perform the method of embodiment 300, while in other embodiments, various applications on a client device may perform the method of embodiment 300.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

In block 302, files may be received. The files may be the payload of a container file and may represent sensitive or protected content to which a user may wish to control access.

The access policy for the files may be defined in block 304. The access policy may define who may access the files. In some embodiments, specific users or groups of users may be identified. In some embodiments, specific devices or groups of devices may be specified. Some embodiments may also specific which applications may or may not be allowed access to the container.

The access policy may also define what capabilities a user, device, or application may have. For example, certain users may have read-only access, while other users may have full control of the files. In some cases, the capabilities may define how many copies, if any, a user may make of the files and whether or not the user may transmit the files to other users.

Restrictions may also be placed in the access policy. A restriction may define any set of conditions that may limit or change the access. For example, an access policy may restrict access to a specific file to a specific time period, after which the file may not be accessed.

An authentication mechanism may be identified in block 306. The authentication mechanism may be a server or service that may verify credentials. In some cases, credentials may be supplied to a third party that may issue a token that verifies the credentials are valid. In some embodiments, two or more authentication mechanisms may be used.

The files may be organized in block 308. In some cases, the files may be grouped into directories or other types of containers, and those containers may be arranged in a hierarchical fashion.

The files may be compressed in block 310. The compression scheme used to compress the files may be any type of compression mechanism. Compression may assist in reducing the size of the files and the overall container file. In some embodiments, no compression may be performed.

A content directory may be created in block 312. The content directory may include links or addresses for each of the files in the container file.

The content directory and the files may be encrypted in block 314. In many embodiments, a single encryption mechanism may be used to encrypt the entire encrypted portion of a container file. In some embodiments, the content directory and the files may be encrypted in two passes. In the first pass, the files may be encrypted and the content directory may be encrypted in a second pass. The content directory may be updated or changed to reflect the encrypted locations of the files after the first pass in some such embodiments.

In some embodiments, certain files within the container file may be encrypted using a second encryption mechanism. One such embodiment may be to include a first container file as a file within another container file. In such an embodiment, two sets of credentials and two encryption mechanisms may be used to access the files.

A publication license for the encrypted files may be created in block 316. In many embodiments, a publication license may include the policy descriptions described above, as well as a license identifier. In some embodiments, the publication license may be created before performing the encryption of block 314.

A container file may be created in block 318 with the encrypted files. Metadata may be added to the container in block 320 and the publication license may be added to the container in block 322. The layout of the container may be updated in block 324 to reference the metadata, publication license, and contents directory.

The container file may be stored in block 326.

Figure 4:
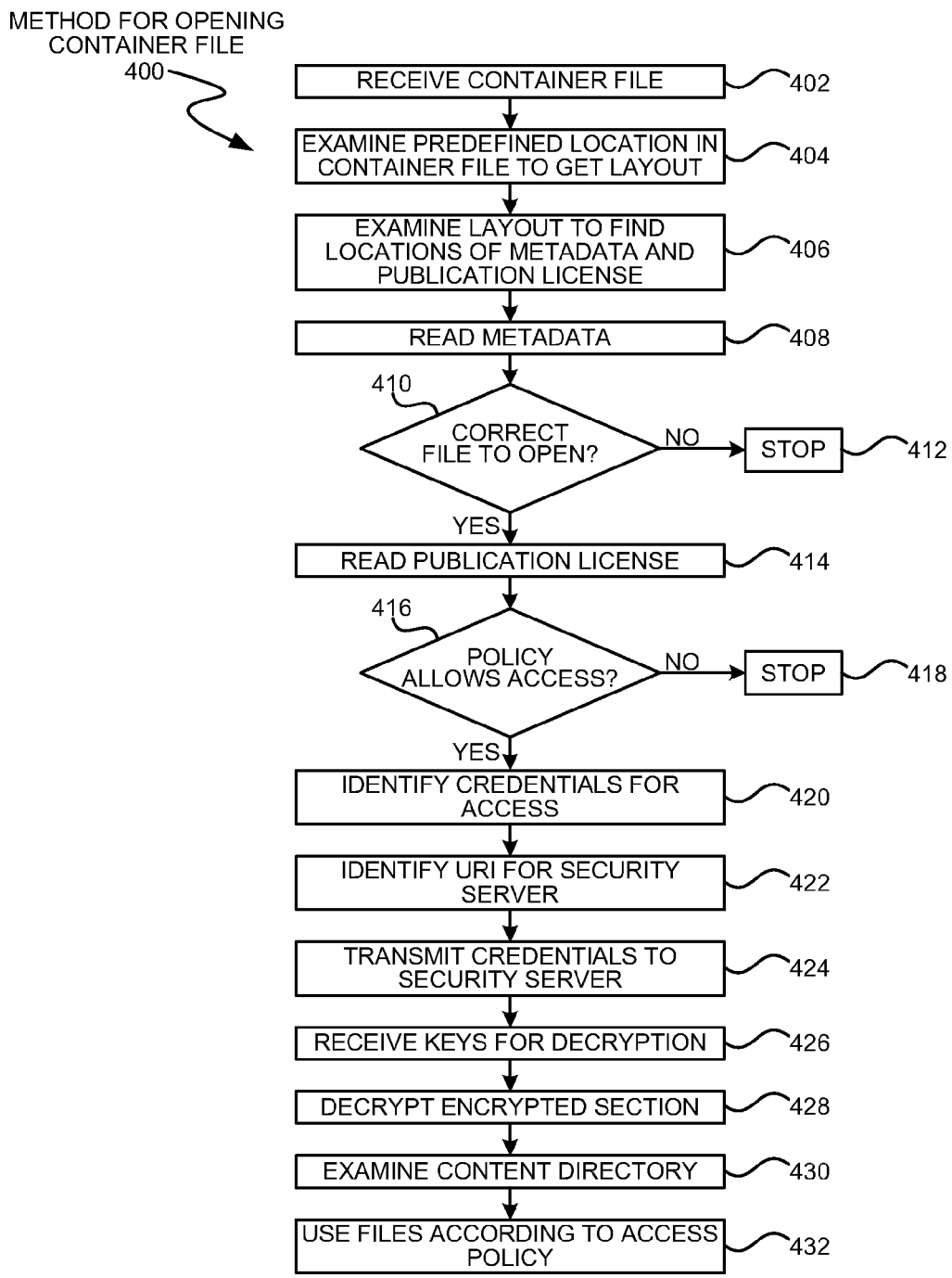
FIG. 4 is a flowchart illustration of an embodiment showing a method for opening a container file.

FIG. 4 is a flowchart illustration of an embodiment 400 showing a method for opening and using a container file. Embodiment 400 is an example embodiment that may be performed by an application that consumes a container file.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 illustrates one method that may be used to access a container file. Embodiment 400 begins by analyzing the unencrypted portions of the container file, then prepares credentials to be verified by a security server. When successfully authenticated, the security server may return keys or other components for decrypting the contents.

A container file may be received in block 402.

The layout may be obtained by examining a predefined location within the container in block 404. In many embodiments, the layout information may be stored in a specific location within the container file. The location may be the same for all container files so that any application that may access the file may find the layout information.

The layout may be examined in block 406 to determine locations for metadata and a publication license. The metadata may be read in block 408 to determine if the container file is the desired container file. If the container file is not the correct file to open in block 410, the process may stop in block 412.

After examining the metadata in block 408 and determining that the container file is the correct file to open in block 410, the publication license may be read in block 414.

The publication license may include a policy definition that may define whether or not a user, device, or application may have access to the contents. If the policy disallows access in the current situation in block 416, the process may stop in block 418.

When the policy may allow access in block 416, the credentials for access may be identified in block 420. A Uniform Resource Identifier (URI) for a security server may be identified in block 422. The URI may be found in the publication license.

The credentials may be transmitted to the security server in block 424 using the URI from block 422 and the credentials in block 420.

Providing that the credentials are proper, the security server may return keys for decryption in block 426. The keys may be any item that may be used to perform decryption, which may be performed in block 428.

Once the encrypted portion is decrypted in block 428, the content directory may be examined in block 430 to identify the various files that may be contained in the container file. Those files may be used according to the access policy in block 432.

In some embodiments, the decryption operation may be performed in two steps. In the first step, the content directory may be decrypted to identify which parts of the container may be encrypted files. From the content directory, some or all of the encrypted files may be identified to be decrypted in a second step.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A storage medium, the storage medium being hardware, storing computer-readable instructions that, when executed, perform actions comprising:
   generating a container file comprising:
     an unencrypted portion comprising:
       a publication license comprising a license identifier, the publication license indicating one or more authorized devices, the publication license indicating a first user is allowed read only access and a second user is allowed read write access;
       a layout section comprising a first pointer to said publication license, said layout section being located at a predefined location within said computer file;
     an encrypted portion encrypted using a first encryption mechanism, the encrypted portion comprising:
       a first encrypted data item encrypted using a second encryption mechanism, the second encryption mechanism being different from the first encryption mechanism; and
       a contents directory comprising a second pointer to said first encrypted data item.

2. The storage medium of claim 1, said first encrypted data item being a first encrypted file.

3. The storage medium of claim 2, said encrypted portion comprising a plurality of encrypted files, said contents directory further comprising at least one pointer to each of said plurality of encrypted files.

4. The storage medium of claim 2, said publication license further comprising an access policy.

5. The storage medium of claim 4, said access policy comprising a condition for accessing said encrypted portion.

6. The storage medium of claim 5, said condition comprising a first user identifier for the first user who is allowed a first type of access.

7. The storage medium of claim 6, said condition comprising a second user identifier for the second user who is allowed a second type of access.

8. The storage medium of claim 1, said encrypted portion being encrypted using a first encryption key, said first encryption key being related to said license identifier.

9. A method comprising:
   reading a container file by a processor comprising:
     an unencrypted portion comprising:
       a publication license comprising a license identifier, the publication license indicating one or more authorized devices, the publication license indicating a first user is allowed read only access and a second user is allowed read write access;
       a layout section comprising a first pointer to said publication license, said layout section being located at a predefined location within said computer file;
     an encrypted portion encrypted using a first encryption mechanism, the encrypted portion comprising:
       a first encrypted data item encrypted using a second encryption mechanism, the second encryption mechanism being different from the first encryption mechanism; and
       a contents directory comprising a second pointer to said first encrypted data item;
   examining said container file at said predefined location within said container file to read said layout section;
   determining a first location within said container file for said publication license;
   reading said publication license to retrieve said license identifier;
   presenting said license identifier to a security server;
   receiving a first encryption key from said security server; and
   unencrypting said contents directory using said first encryption key.

10. The storage medium of claim 1, the license identifier being a unique license identifier.

11. The storage medium of claim 1, the publication license indicating a number of copies of the first encrypted data item that can be made.

12. The method of claim 9 further comprising:
   presenting user credentials to said security server prior to retrieving said first encryption key.

13. The method of claim 12 further comprising:
presenting an application identification for a receiving application for said container file, said receiving application being capable of applying an access policy defined in said publication license.

14. The method of claim 13, said access policy defining a read only access for any user having said user credentials.

15. The method of claim 13, said access policy defining read and write access for any user having said user credentials.

16. The method of claim 13, said access policy defining at least one restriction on said user access.

17. The method of claim 16, said restriction being a time restriction.

18. An apparatus comprising:
a processor configured to provide:
a container generator configured to generate a container including:
an unencrypted portion comprising:
a publication license comprising an access policy and a license identifier, the publication license indicating one or more authorized devices, the publication license indicating a first user is allowed read only access and a second user is allowed read write access;
a metadata section;
a layout section comprising a first pointer to said publication license and a second pointer to said metadata section, said layout section being located at a predefined location within said computer file;
an encrypted portion encrypted using a first encryption mechanism, the encrypted portion comprising:
a first encrypted file encrypted using a second encryption mechanism, the second encryption mechanism being different from the first encryption mechanism; and
a contents directory comprising a second pointer to said first encrypted data item, said layout section further comprising a third pointer to said contents directory.

19. The apparatus of claim 18, said access policy comprising a user identifier and a set of access permissions associated with said user identifier.

20. The apparatus of claim 19, said publication license further comprising a Uniform Resource Identifier for a security server capable of receiving user credentials and said license identifier and returning a second encryption key capable of decrypting said contents directory.

* * * * *